Sept. 15, 1936.      D. W. BURT      2,054,459
MANUSCRIPT MANIPULATOR
Filed May 16, 1935      4 Sheets-Sheet 1
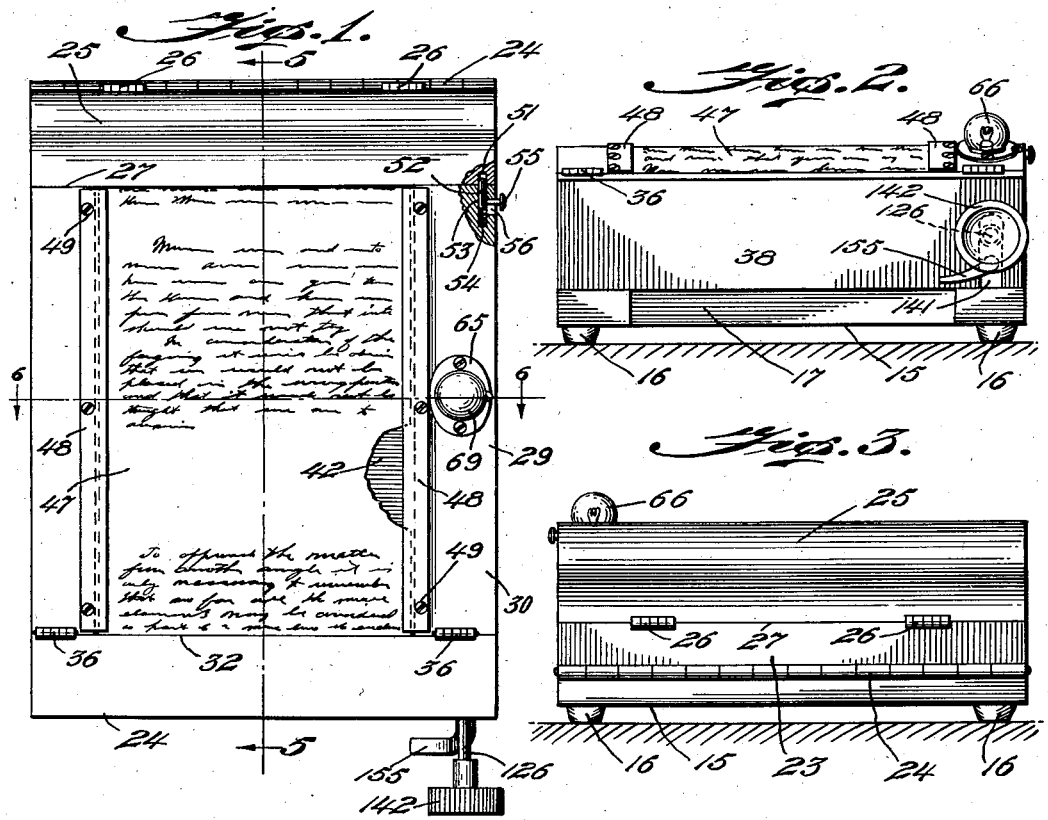
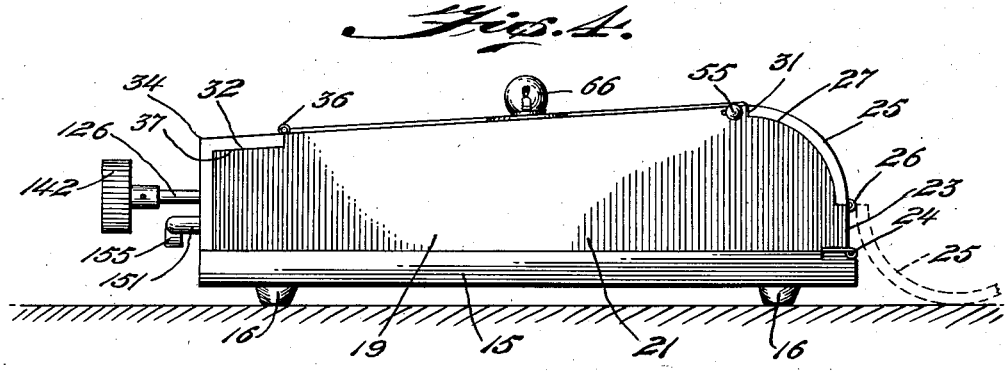
Inventor
Daniel W. Burt.
By Horatio E. Bellows
Attorney

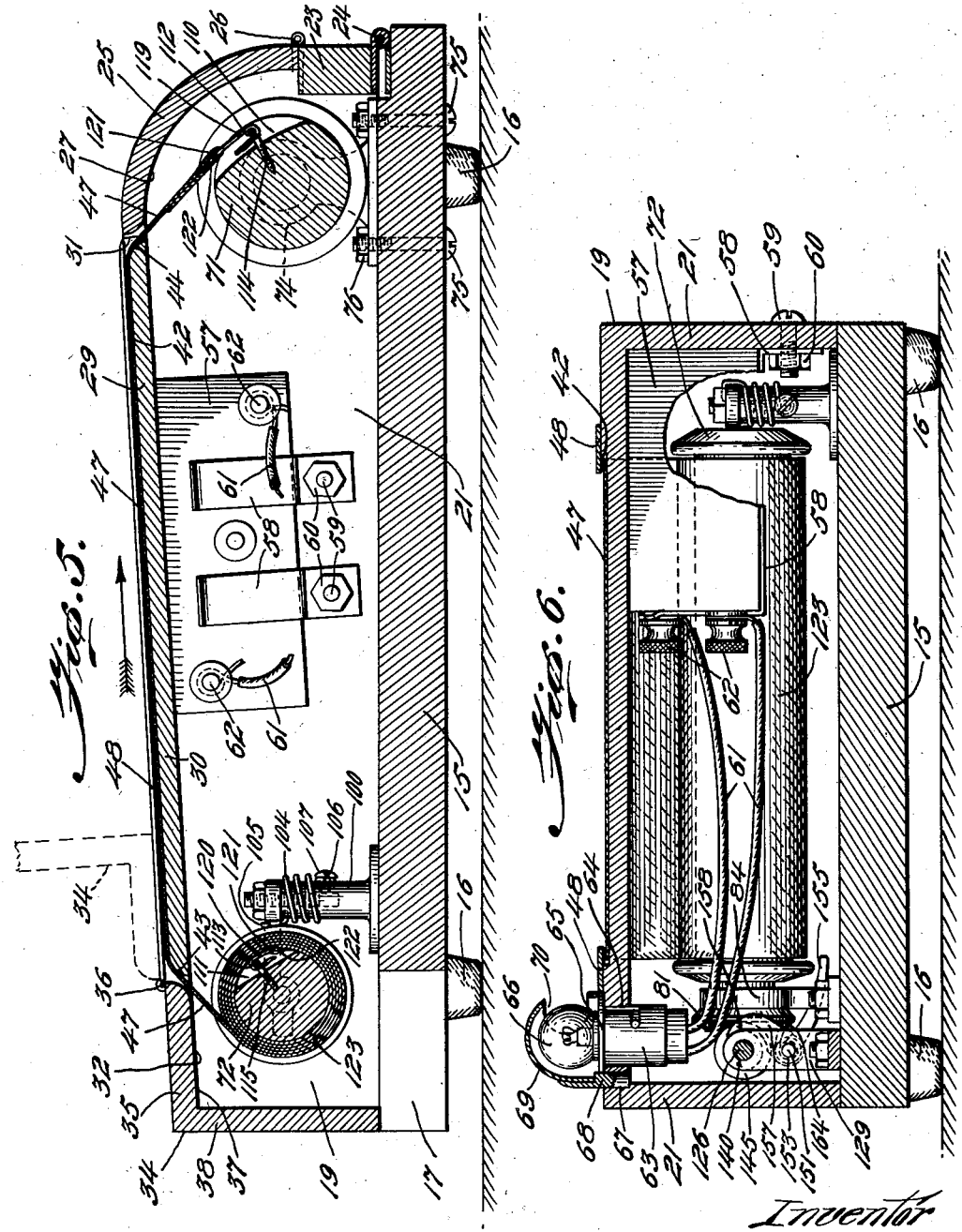

Sept. 15, 1936.   D. W. BURT   2,054,459
MANUSCRIPT MANIPULATOR
Filed May 16, 1935   4 Sheets-Sheet 3
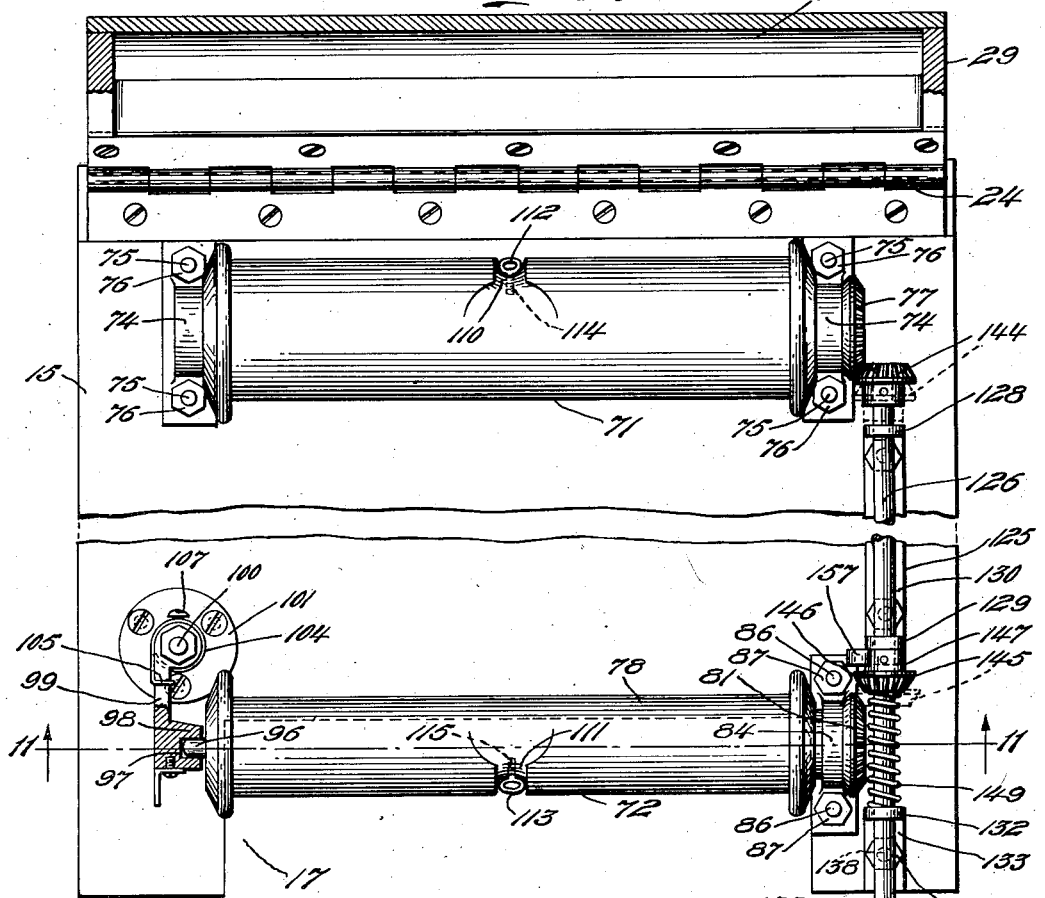
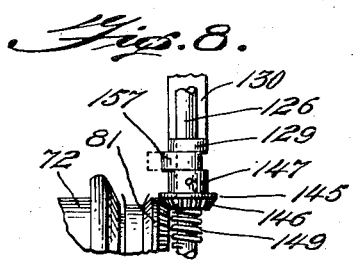
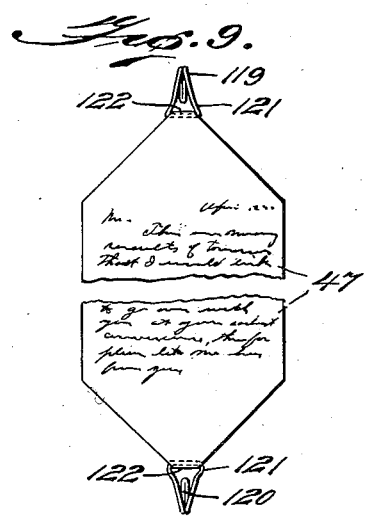
Inventor
Daniel W. Burt
By Horatio E. Bellows
Attorney Sept. 15, 1936.   D. W. BURT   2,054,459
MANUSCRIPT MANIPULATOR
Filed May 16, 1935   4 Sheets-Sheet 4
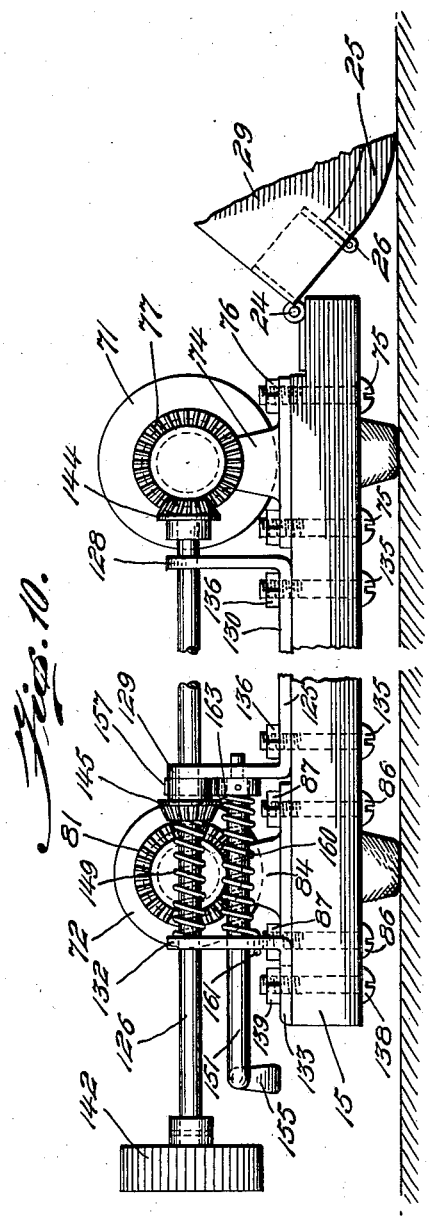
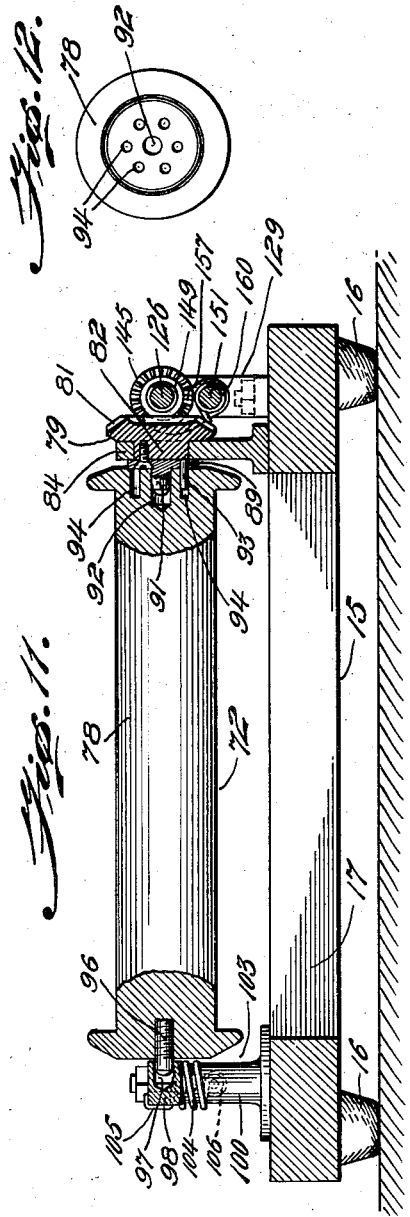
Inventor
Daniel W. Burt
By Horatio E. Bellows
Attorney Patented Sept. 15, 1936

2,054,459

UNITED STATES PATENT OFFICE 2,054,459

MANUSCRIPT MANIPULATOR

Daniel W. Burt, Providence, R. I.

Application May 16, 1935, Serial No. 21,742

17 Claims. (Cl. 281—8)

My invention relates to a roller impelled device for advancing and retracting a flexible strip containing written or printed characters, or purposed to receive such characters.

Heretofore such devices had no means, in conjunction with the propulsion of the strip, for enabling the operator to make notes upon the latter after it was mounted in the device for operation. An essential object of my invention, therefore, is to overcome this defect, thereby making it possible for the operator, such as a lawyer, to make notes upon the mounted travel strip during direct examination of a witness for instant reference upon cross examination, rather than be compelled to record his notes upon fugitive sheets of paper subject to confusion or loss.

Further objects are to afford a lecturer or minister an extended area of display of the reading matter upon his manuscript, whereby he is enabled to occularly anticipate material which he has not yet reached in his delivery; to provide means for assisting to maintain the entire exposed portion of the reciprocable strip in contact with the top surface of the housing, and to assist the guidance of the strip in its travel; to provide an illumination for the strip above the housing; to supply simple and easily operated driving and shifting means for actuating both the supply and take up rollers whereby the strip is promptly impelled and reversed in its travel upon the housing; and to render accessibility to both the rolls when the strip connecting them is engaged with the housing.

Additional objects are to enable the attachment or detachment of one end of the strip to or from the take up roller after the strip is engaged with the housing; and to enable the facile demounting of the supply or rewind roller.

Other objects and advantages of the invention will hereinafter be adverted to or be apparent from the following description taken in connection with the accompanying drawings, in which only the preferred form of the invention has been shown and described by way of illustration. It is apparent that many changes and modifications may be made in the arrangement and construction of the parts and I, therefore, do not wish to be limited to the arrangement and constructions shown as they may be varied without departing from the spirit of the invention as expressed in the claims attached hereto.

Referring to the drawings wherein similar characters designate corresponding parts throughout:

Figures 1, 2, 3 and 4 are a top plan view, partially fragmentary, a front end view, a rear end view, and a side elevation respectively of my novel device, the lamp hood being omitted in the last three above figures, Figures 5 and 6, sections of the same taken on lines 5—5 and 6—6 respectively of Figure 1, Figure 7, a fragmentary top plan view of the same, omitting the web, with the housing thrown back, Figure 8, a fragmentary plan view of the latch device, Figure 9, a similar view of the record strip detached, Figure 10, a fragmentary side elevation of my device as viewed from the right, with the web omitted and the housing thrown back, Figure 11, a front elevation of the same, partially in section on line 11—11 of Figure 7, and Figure 12, an end view of the body section of one of the rollers.

The embodiment of my device herein set forth, an oblong base 15 supported near its four corners by rubber feet 16 has centrally of its forward end a rectangular recess 17.

A housing 19 normally rests upon the base and comprises side walls 21 with their top edges upwardly inclined towards the rear, a rear wall including an upright lower portion 23 integral with the side walls and connected to the base by a hinge 24, and an upwardly and forwardly curved portion 25 connected to the top of the lower portion by hinges 26 to form a hand opening 27, an inclined top wall 29 including a relatively fixed section 30 integral with the side walls contacting at its rear edge with the forward edge of the back wall portion 25, as at 31, and terminating at its front edge at a point short of the forward ends of the side walls to form a hand opening 32, and a movable section 34 comprising a top portion or wall 35 attached by hinges 36 to the fixed section and resting in cut outs 37 in the side walls, and a vertical front portion or wall 38 integral with the free end of the top portion of the movable section, and abutting against the forward ends of the side walls. The angular section 35 forms a closure for the hand opening cooperating with the recess 17.

Intermediate its width the upper surface of the section 30 of the top wall is provided with a longitudinally disposed guideway 42 continuous at its front and rear ends with inset downwardly inclined guide slots 43 and 44 respectively, as shown in Figure 5. This guideway is for the accommodation of a flexible strip 47 preferably of paper and having either an originally blank or a written or printed surface, and is supplemented with longitudinally disposed guard plates 48 attached by screws 49 to the top of the section 30 with their inner edges extending transversely over the margins of the guideway and strip.

As shown in Figure 1 the forward edge of the closure member 25 has a cavity 51 in which is the end of a slidable bolt 52 in a recess 53 in the top wall pressed by spring 54. The bolt is movable against the spring pressure by projecting finger-pin 55 slidable in a slot 56. This catch prevents accidental movement of the closure member 25.

A battery 57, as shown in Figures 5 and 6, is supported in the housing by clips 58 fixed by screws 59 and nuts 60 or otherwise to one of the housing side walls. Circuit wires 61 held in electrical connection with the battery by binding screws 62 extend to a lamp socket 63 fixed in an opening 64 in the top wall of the housing by an attaching plate 65 thereon, and carrying an electric bulb 66 projecting above the housing. In the top wall of the housing adjacent the opening 64 is a cylindrical hole or socket 67 for the slidable reception of a depending post or stem 68 fixed to a hood 69 enclosing the bulb 66 and provided with a lateral opening 70 for the admission of the lamp rays to the surface of the strip 47, thus serving as a protection for the operator's eyes.

The strip 47 has one end carried by a take up or winding roller, or spool 71, and the other end by a supply or rewinding roller 72 within the housing. The rollers are disposed transversely of the housing and are located adjacent the back and front walls thereof respectively. The roller 71, which is of greater diameter than its companion, is journaled in standards 74 fixed to the base 15 by bolts 75 and nuts 76, and has fixed to or integral with one of its ends a bevel gear 77.

Roller 72, as shown in Figure 10, includes a body section 78 and an end section 79, the latter including a bevel gear 81 and stub 82 journaled in a standard 84 fixed to the base by bolts 86 and nuts 87. A disk 89 fastened to the end of stub 82 has an integral connecting pin 91 loose in an axial opening 92 in one end of the body section 78. A locking pin 93 fixed in the disk 89 is adapted to slidably enter any selected one of an annular series of holes 94 surrounding the axial opening 92, and shown in Figure 11 for circular adjustment of the section 78.

A bearing pin 96 is axially fixed in the other end of the roll section 78, and loosely enters a hole 97 in a lateral extension 98 upon the end of an arm 99 pivotally mounted at its other end upon the upper portion of a post 100 having an attaching flange 101 fixed to the base 15 by screws 102. The described extension, post, and flange form a standard 103 cooperating with the standard 84. The extension 98 is normally retained in engagement with the pin 96 by means of a helical spring 104 surrounding the post with one end of its ends 105 engaging the arm 99 and its other end 106 engaging a pin 107 in the post, as shown in Figures 5, 7, and 10. The roller section 78 may be demounted when desired by first manually pivoting the arm 99 away from the pin 96, and then removing the section 78 from the pin 91.

Transversely disposed peripheral depressions 110 and 111 in rollers 71 and 72 respectively, as shown in Figures 5 and 7, accommodate the eyes 112 and 113 of eye screws or staples 114 and 115 whose shanks are fixed in their respective rollers. The eyes are adapted to slidably receive the beak portion of flat hooks 119 and 120 respectively, each having a terminal shank loop 121 loose in a loop 122 formed in each end of the strip 47.

The strip is detachable from the rolls, and is initially attached to the latter by engaging the hook 120 with the eye 113 and then, either manually or mechanically, winding a major portion of the strip upon the roller 72, in the form of a roll 123. The unwound portion of the strip, which leaves the upper portion of the roll, is next manually drawn through the slots 43 and 44 over the guideway 42, and the hook 119 engaged with the eye 112 of the roller 71 after the closure section 34 and wall portion 25 have been opened to the broken line positions respectively shown in Figures 5 and 4. The open positions of the members 34 and 35 prevent accidental interference with the hook 119 as it is threaded through the slots, and afford manual access to both rollers during the threading operation.

As the section 78 of the rewind roll is detachable for storage purposes it will be understood that a previously used roll 123, taken from storage, is often already upon the section 78 when the latter is mounted preparatory for threading to the roller 71. If a fresh strip is to be used it may have its forward end first introduced through the rear housing opening 27 and be threaded through the slots 44 and 43 and its advancing hook be first engaged to the roller 72 to be initially wound thereon preparatory to the attachment of the rear hook to the roller 71. The latter roll will after the attachment of the rear hook to the roller 71 be ready to perform its function of a winding roll.

A framework 125 for supporting a driving shaft 126 for actuating the rollers 71 and 72, as shown in Figure 10, includes uprights 128 and 129 integral with the ends of a longitudinally disposed plate 130, and an upright 132 integral with a plate 133. The plate 130 is attached to the base 15 by bolts 135 and nuts 136; and the plate 133, by a bolt 138 and nut 139. The shaft 126 is longitudinally slidable and rotatably mounted in perforations 140 in the upper portions of the three uprights, and projects through a vertical slot 141 in the front wall 36 of the movable housing section 34 and has fixed to its end a milled knob or wheel 142.

Fixed to the forward portion of the shaft 126 is a bevel pinion 144, and to an intermediate portion of the former, a bevel pinion 145 including head portion 146 and a sleeve portion 147. The pinions 144 and 145 have their beveled or toothed portions oppositely directed and are interspaced a shorter distance than are the gears 77 and 81 with which they are respectively adapted to alternately intermesh, in accordance to the two different longitudinal positions assumed by the shaft 126.

A helical spring 149 surrounding the shaft 126, having one end pressing against the upright 132 and its other end abutting against the head of the pinion 145, normally maintains the pinion 145 against the upright 129, the pinion 144 in mesh with the gear 77, and pinion 145 out of mesh with the gear 81. With the parts thus positioned the operator, by turning the wheel 142 clockwise from time to time drives the roller 71 only, thus drawing the strip 47 from the now idle roller 72 over the guideway 42 the desired distance in the direction of the arrow in Figure 5, and the advanced end of the strip is thereby taken up into a resultant coil upon the roller 71.

A rock shaft 151 is mounted below and in the vertical plane of the driving shaft in perforations 153 in the uprights 129 and 132, and projects through the slot 141 in the front of the housing, having upon its outer end a laterally projecting finger piece 155. Fixed at its lower end to the rock shaft and in contact with the upright 129 is an upwardly directed laterally flat bearing or locking lug 157 with a curved forward edge 158, as shown in Figure 6, pressed in contact with the sleeve portion 147 of the pinion 145. This forward pressure is imparted by a coil spring 160 loosely surrounding the shaft 151 having one end 161 fixed in the upright 132 and having a rearwardly and upwardly directed radial arm portion 163 near its other end terminating in a horizontal finger portion 164 pressing against the rear edge of the lug 157. The described rock shaft mechanism is employed in conjunction with the operation of shifting the drive of the winding roll to the drive of the rewind roll as follows.

When, for any reason, it is desired to reverse the forward travel of the sheet over the guideway to movement in the opposite direction, the operator first pulls the knob 142 rearwardly towards himself against the action of the spring 149 until the pinion 145 disengages gear 77 and the pinion 145 meshes with gear 81 whereupon the lug 157 under the influence of the spring 160 snaps forwardly into the resultant space between the upright 129 and the end of the portion 147 of the pinion 145, thus blocking the latter for disengagement from the gear 81. Thereupon the operator rotates the knob 142 clockwise thus moving the strip the desired distance in the direction opposite that of the arrow in Figure 5, and drawing the material from the now idle roller 71. A downward stroke of the operator's finger upon the finger piece 155 withdraws the lug 157 from its locking or spacing position, and the driving rod 126 under the influence of the spring 149 immediately advances to again intermesh the pinion 144 with the gear 77.

The disposition of the pinions in opposite directions to each other upon the shaft 126 relatively to their respective intermeshing rollers makes possible the advantage that the operator under all circumstances, whether advancing or retracting the strip upon the guideway, moves the knob 142 clockwise only, and never anti-clockwise, thus avoiding distraction of attention or confusion of the operator.

The increased diameter of the roller 71 over that of the roller 72 causes a greater speed of the strip 47 over the guideway in the direction of the arrow than in the opposite direction, which is an advantage to one delivering a lecture or sermon.

It is to be noted that the passage of the strip 47 over a portion of the top wall 29, exterior of the housing, and the support for the writer's hand afforded by said wall, makes my device utilizable for cross examination or court reporting.

The guideway 42 for the strip 47 assists the slots 43 and 44 in defining the path of the strip upon the housing top, and the guard plates 48 overlapping the guideway serve to depress the strip into adjacency with the guideway surface when the material of the strip is unusually stiff.

The location of the light bulb 66 at a point in the housing top adjacent an intermediate portion of the guideway, and in a plane above the housing insures an effective distribution of the rays upon the top surface of the strip 47, while the hood 69 prevents dissipation of superfluous rays.

The hand opening 27 in the housing adjacent the roller 71, and the hand openings 40 and recess 17 continuous therewith in the forward portion of my device adjacent the roller 72 make both rolls accessible for attaching or detaching the strips from the rollers while the strip is in threaded position.

The hinged connection of the housing with the base makes it possible when the strip is in unthreaded position, to entirely disclose for repair the rollers and their actuating mechanism, as well as the electric battery and wiring.

I claim:—

1. In a manuscript manipulator, a housing including a top wall provided with parallel slots and a longitudinal groove extending between said slots in the top surface of the top wall, guard plates seated upon the top wall and rigidly fixed thereto along the edges of the groove and extending between the slots, interspaced rotatable rollers within the housing, and a flexible strip connecting the rollers extending through the slots beneath the guard plates and in contact therewith.

2. In a manuscript manipulator, a housing including a top wall provided with parallel slots and with a guideway groove formed in the top surface of the top wall and connecting the slots, guard plates permanently fixed to the top wall at the edges of the groove and extending over the guideway, interspaced winding rollers within the housing, a flexible strip attached at its ends to the rollers extending through the slots and slidable in the guideway in contact with the guard plates, and mechanism for actuating the rollers.

3. In a manuscript manipulator, a base, a housing thereon including a top wall provided with a guideway and with transverse slots at the ends of the guideway, and with a lamp socket adjacent the guideway, and with a second socket adjacent the first socket, an electric light bulb in the first socket projecting above the top wall, and a light protector comprising a stem removably inserted into the second socket and a hood upon the stem enclosing the bulb and provided with a lateral light opening, said lamp and protector being removable from the sockets.

4. In a manuscript manipulator, a base, a housing on the base including a top wall provided with interspaced transverse guide slots, a pair of standards fixed to the base in the rear portion of the housing disposed transversely of the top wall, a winding roller journaled in said standards, gear teeth carried upon the end of the roller, a rigid standard fixed to the base in the forward portion of the housing, a laterally yieldable standard fixed to the base beside the rigid standard interspaced therefrom, the rigid standard and the yieldable standard being disposed in parallelism with the pair of standards, a rewind roller comprising an end section journaled in the rigid standard, and a body section detachably engaging the end section journaled in the yieldable standard, gear teeth carried upon the end of the end section, a framework fixed to the base transversely of the rollers, a longitudinally slidable driving shaft rotatably mounted in the framework, means for advancing and enabling the retraction of the shaft, a pinion upon the shaft engagable with the teeth of the winding roller for advancing the strip when the shaft is moved in advanced position, and a pinion engageable with the teeth of the rewind roller to reverse the travel of the strip when the shaft is in retracted position.

5. In a manuscript manipulator, a base provided centrally of its forward end with a recess, a housing comprising side walls, a rear wall including a lower portion integral with the side walls and hinged to the base, and an upwardly curved upper portion hinged to the top of the lower portion, an inclined top wall including a relatively fixed section integral with the side walls contacting at its rear edge with the forward edge of the upper back wall portion and terminating at its front edge at a point short of the forward ends of the side walls to form a hand opening, and a movable section including a top portion hingedly connected to the fixed section and a front portion abutting against the forward ends of the side walls, said fixed section of the top wall being provided with a longitudinally disposed guideway and with inset guide slots at the end of the guideway, a rewinding roller rotatably supported upon the base above the recess and below the movable section, a winding roller rotatably supported upon the base adjacent the upper portion of the rear wall, a flexible member attached at its ends to the rollers and traversing the guide slots and guideway, and a driving shaft in the housing having gear connections with the winding roller for drawing the strip over the guideway.

6. In a manuscript manipulator, a base, a housing on the base including a top wall provided with a pair of interspaced parallel slots, a rewinding roll rotatably supported by the base in the front portion of the housing, a winding roll rotatably supported by said base in the rear portion of the housing, a flexible strip connecting the rollers slidable through the slots and over the top wall, gears fast to the rollers, a framework upon the base, a longitudinally slidable driving shaft rotatably supported in the framework and extending exterior of the housing, an operating wheel upon the extended portion of the shaft, a pinion upon the forward portion of the shaft, a spring upon the framework normally forcing the pinion in mesh with the gear on the rear roller, and an oppositely disposed pinion upon an intermediate portion of the shaft adapted to mesh with the gear upon the forward roller when the shaft is manually retracted against the force of the spring whereby the shaft may be manually rotated to impel the strip in a direction opposite to the direction of travel induced by a similarly directed rotation of the shaft when the first pinion was in mesh with its gear.

7. In a manuscript manipulator, a base, a housing on the base including a top wall provided with a guideway and with parallel slots at the ends of the guideway, a rewinding roll rotatably supported by the base in the front of the housing, a winding roll similarly supported by the base in the rear of the housing, a flexible strip connecting the rollers and slidable on the guideway through the slots, gears upon the rollers, a framework upon the base, a longitudinally slidable driving shaft rotatably supported in the framework and extending outside the housing, an operating wheel fixed to the extended portion of the shaft, a pinion fixed to the forward end of the shaft, a spring upon the framework normally forcing the pinion in mesh with the gear on the rear roller for impelling the strip forwardly, and a pinion upon the shaft a less distance from the first pinion than the distance between the two gears and adapted to mesh with the gear upon the forward roller when the shaft is manually retracted against the force of the spring whereby the rotation of the shaft causes the strip to travel in a direction oppositely from that caused by a similarly directed rotation of the shaft when the first pinion was in mesh with its gear, and means for locking the shaft in retracted position.

8. In a manuscript manipulator having winding rolls, bevel gears for turning said winding rolls, a shaft slidably mounted in the manipulator and carrying bevel pinions in position to mesh alternately with the bevel gears upon slidable adjustment of the shaft to different positions, an abutment carried by the shaft, a spring-pressed lug in position to engage behind the abutment upon movement of the shaft to one position, and means for releasing said lug from the abutment for return of the shaft to the opposite position.

9. In a manuscript manipulator having winding rolls, bevel gears for turning said winding rolls, a shaft slidably mounted in the manipulator and carrying bevel pinions in position to mesh alternately with the bevel gears upon slidable adjustment of the shaft to different positions, an abutment carried on the shaft, a spring-pressed lug in position to engage behind the abutment upon movement of the shaft to one position, resilient means normally tending to move the shaft in the opposite direction, and means extending to a point externally of the manipulator and operatively associated with the lug for releasing the same permitting movement of the shaft to the opposite position by the resilient means.

10. In a manuscript manipulator, a casing, winding rolls mounted therein to receive a web, bevel gears attached to the ends of the rolls for turning the same, a shaft slidably mounted in the casing adjacent the bevel gears and carrying bevel pinions in position to mesh alternately with the gears upon slidable adjustment of the shaft to different positions, a hub on the shaft, a rockshaft mounted in the casing and having an end extending to a point externally of the casing, a lug fixed to said rock-shaft and normally riding on the hub in position to engage behind the hub when the first-mentioned shaft is moved to one extreme position, resilient means normally tending to press said first-mentioned shaft in the opposite direction, and resilient means normally tending to press the lug against the hub.

11. In a manuscript manipulator, a base, a housing mounted on the base and comprising side walls and a rear wall rigid with the side walls, means hinging said housing to the base, a top portion rigid with the side walls, and hinged doors at the front and back of said top portion for inspection of the interior of the housing.

12. In a manuscript manipulator, a base, a housing mounted on the base, and adapted to enclose rolls therein in its front and back portions, said housing comprising side walls, a rear wall rigid with the side walls, and a top portion rigid with the side walls, means hinging said housing to the base, a door hinged to the back wall and cooperating with the top portion, and a second door hinged to the forward edge of the top portion, said hinged doors being arranged for inspection of the rolls within the housing.

13. In a manuscript manipulator, a base, a housing mounted on the base and comprising side walls and a rear wall rigid with the side walls, means hinging said housing to the base, a top portion rigid with the side walls and having interspaced openings therein for passage of a strip therethrough, two interspaced rollers rotatably supported by the base in the housing and adapted to be connected by a flexible strip extending through the openings in the top portion, and hinged doors at the front and back of said top portion for inspection of the interior of the housing and rollers.

14. In a manuscript manipulator, a base, a housing mounted on the base and comprising side walls, a rear wall rigid with the side walls, and a top portion rigid with the side walls and having interspaced openings therein for passage of a strip therethrough, means hinging said housing to the base, two interspaced rollers rotatably supported by the base in the housing at the front and back portions thereof and adapted to have a flexible strip connecting the rollers and extending through the openings in the top portion, a door hinged to the back wall and cooperating with the top portion, and a second door hinged to the forward edge of the top portion, said hinged doors being arranged for inspection of the rollers within the housing.

15. In a manuscript manipulator, a base, a housing mounted on the base and comprising side walls, a rear wall rigid with the side walls, and a top portion rigid with the side walls and having interspaced openings therein for passage of a strip therethrough, means hinging said housing to the base, two interspaced rollers rotatably supported by the base in the housing at the front and back portions thereof and adapted to have a flexible strip connecting the rollers and extending through the openings in the top portion, a door hinged to the back wall and cooperating with the top portion, and a second door hinged to the forward edge of the top portion, said hinged doors being arranged for inspection of the rollers with the housing, and means for independently rotating the rollers for movement of the flexible strip through the top portion.

16. In a manuscript manipulator, a base, a housing mounted on the base and comprising side walls and a top portion rigid with the side walls, means hinging said housing to the base, and hinged doors at the front and back of said top portion for inspection of the interior of the housing.

17. In a manuscript manipulator, a base, a housing mounted on the base and comprising side walls and a top portion rigid with the side walls and having interspaced openings therein for passage of a strip therethrough, means hinging said housing to the base, two interspaced rollers rotatably supported by the base in the housing and adapted to be connected by a flexible strip extending through the openings in the top portion, and hinged doors at the front and back of said top portion for inspection of the interior of the housing and rollers.

DANIEL W. BURT.